United States Patent
Behrends

(10) Patent No.: US 9,831,916 B2
(45) Date of Patent: Nov. 28, 2017

(54) METHOD AND SYSTEM FOR TRANSMITTING DATA VIA DIRECT CURRENT LINES

(71) Applicant: SMA Solar Technology AG, Niestetal (DE)

(72) Inventor: Holger Behrends, Rhauderfehn (DE)

(73) Assignee: SMA Solar Technology AG, Niestetal (DE)

(*) Notice: Subject to any disclaimer, the term of this patent is extended or adjusted under 35 U.S.C. 154(b) by 0 days.

(21) Appl. No.: 14/946,851

(22) Filed: Nov. 20, 2015

(65) Prior Publication Data

US 2016/0087679 A1    Mar. 24, 2016

Related U.S. Application Data

(63) Continuation of application No. PCT/EP2014/060433, filed on May 21, 2014.

(30) Foreign Application Priority Data

May 22, 2013 (DE) .................. 10 2013 105 209

(51) Int. Cl.
    H04B 3/46    (2015.01)
    H04B 3/54    (2006.01)
(52) U.S. Cl.
    CPC .............. *H04B 3/548* (2013.01); *H04B 3/46* (2013.01)
(58) Field of Classification Search
    CPC .................... H04B 3/46; H04B 3/548
    See application file for complete search history.

(56) References Cited

U.S. PATENT DOCUMENTS

| 8,811,529 B1 | 8/2014 | Pelletier et al. |
| 2008/0043992 A1 | 2/2008 | Hurwitz |
| 2008/0090544 A1* | 4/2008 | Hubert .............. H04B 3/548 455/334 |

(Continued)

FOREIGN PATENT DOCUMENTS

| DE | 19940544 A1 | 3/2001 | |
| FR | 2870061 A1 * | 11/2005 | .............. H04B 3/54 |

(Continued)

*Primary Examiner* — Jaison Joseph
(74) *Attorney, Agent, or Firm* — Eschweiler & Potashnik, LLC

(57) ABSTRACT

The disclosure relates to a method for transmitting data via direct current lines for energy transmission from a first communication unit to a second communication unit. The method includes generating a high-frequency test signal having a predefined voltage amplitude by the first or the second communication unit and coupling the high-frequency test signal onto the direct current lines. The method further includes determining a current level caused by the high-frequency test signal on the direct current lines by the first communication unit, and determining a voltage amplitude for a high-frequency signal based on the current level caused by the test signal. The method also includes coupling a high-frequency signal having the predetermined voltage amplitude onto the direct current lines by the first communication unit. The disclosure also relates to a system for transmitting data via direct current lines for energy transmission and to a photovoltaic installation having such a system.

19 Claims, 5 Drawing Sheets

(56) References Cited

U.S. PATENT DOCUMENTS

| | | | | |
|---|---|---|---|---|
| 2010/0301991 | A1* | 12/2010 | Sella | G08B 13/1409 340/3.1 |
| 2012/0314785 | A1* | 12/2012 | Hua | H04L 27/2602 375/260 |
| 2013/0120017 | A1 | 5/2013 | Hopf et al. | |
| 2013/0141133 | A1 | 6/2013 | Kratochvil et al. | |
| 2014/0294103 | A1* | 10/2014 | Mese | H04B 3/542 375/257 |
| 2015/0174972 | A1* | 6/2015 | Zhou | B60C 23/003 340/447 |

FOREIGN PATENT DOCUMENTS

| | | | |
|---|---|---|---|
| WO | 2011085952 | A2 | 7/2011 |
| WO | 2014095593 | A1 | 6/2014 |

\* cited by examiner

METHOD AND SYSTEM FOR TRANSMITTING DATA VIA DIRECT CURRENT LINES

CROSS REFERENCE TO RELATED APPLICATIONS

This application claims priority to International Patent Application number PCT/EP2014/060433, filed on May 21, 2014, which claims priority to German Patent Application number 10 2013 105 209.6, filed on May 22, 2013, and is hereby incorporated in its entirety.

FIELD

The disclosure relates to a system for transmitting data via direct current lines for energy transmission.

BACKGROUND

In photovoltaic (PV) installations, the power-generating PV generators are connected to one or more remotely mounted inverters via direct current lines which are often very long. In this case, devices such as protective devices or measuring devices which are close to the generator and communicate with the inverter or other control units installed close to the inverter are often provided. In addition to conventional wired communication methods via separate signal lines or serial and/or parallel bus or network connections or radio connections, communication can also take place via the direct current lines which are used to connect the PV generator to the inverter. Such communication for the purpose of transmitting data via lines for energy transmission is also known as powerline communication (PLC). In this case, the communication signal is coupled onto the lines for energy transmission as an HF signal and is coupled out again and analyzed at the receiving end by means of corresponding coupling-out means.

Another use of high-frequency signals in PV installations is described in the documents DE 10 2010 036 514 A1 and WO 2012/000533 A1. A high-frequency signal fed into a photovoltaic installation is coupled out again and evaluated at another location. For example, the signal response which has been coupled out is compared with reference data which were recorded during fault-free normal operation of the photovoltaic installation. Events which impair the operation of the PV generator are inferred on the basis of the evaluation of the signal response. Such events are, for example, theft of one or more PV modules or contact problems which have occurred.

The document DE 199 40 544 A1 discloses a circuit arrangement for coupling an HF signal for transmitting data onto an AC low-voltage network, such as a typical domestic electrical installation. In this case, a network for matching the impedance to a transformer is connected downstream of an output amplifier for the transmission signal, the transformer transmitting the signal to the alternating current lines of the domestic installation. The circuit arrangement has a control device which uses a current measurement inside the transmission network to vary the voltage amplitude of the HF signal at the input of the transmission network via the output amplifier in such a manner that the HF signal on the alternating current lines of the domestic installation has a constant voltage amplitude of a predefined level. Receivers for the HF signal are arranged in a manner substantially parallel to loads inside the domestic installation. The constant voltage amplitude ensures that an equally strong signal is received at any of possibly a plurality of receiving units connected in parallel.

In PV installations, the PV generator usually has one or more series circuits comprising a plurality of PV modules, a so-called string. A plurality of such strings which are connected in parallel with one another often form the PV generator. Receivers for data, which are transmitted on the direct current lines starting from an inverter or a central control device using an HF signal, are present under certain circumstances at the level of individual PV modules. Data transmission in the opposite direction from a transmitter arranged in the string to a receiver positioned close to the inverter is also customary. Transmitting and/or receiving devices are referred to as communication units below. They may be set up both for unidirectional and for bidirectional data transmission.

Owing to the series connection of the PV modules inside a string and the parallel connection of two or more strings, the signal strength which can be coupled out at an individual PV module in known circuit arrangements for coupling in the HF signal is often low and is also not known a priori even if the transmission signal strength is known. This is explained in more detail below by way of example for the case of communication from the inverter in the direction of the PV modules taking into account inductive coupling-in and coupling-out of the HF signals. In the case of inductive coupling-out, the signal strength of the HF signal which has been coupled out results from the current intensity of this signal at the location of the receiver (here: the PV modules). If, during transmission, the HF signal at the location of the inverter is now coupled onto the direct current lines with a constantly predefined voltage amplitude, for example, a corresponding current intensity of the HF signal is established depending on the impedance inside the DC circuit. The signal strength of the HF signal which has been coupled out is therefore dependent on the impedance in this DC circuit and is therefore generally different for different PV installations. If, in contrast, during transmission, the HF signal is coupled onto the direct current lines in such a manner that it has a predefined current amplitude at the coupling-in location, a predefined signal strength of the HF signal which has been coupled out is also ensured at the location of the PV modules in the case of an unbranched DC circuit. However, this is no longer the case if the DC circuit of a PV generator has branches, for example in the form of a plurality of strings connected in parallel. In this case, the current intensity of the HF signal coupled in at the location of the inverter is divided among the individual strings at the branch points depending on the impedances of the strings. This results in a signal strength which can be coupled out at an individual PV module, is generally low and is not known a priori, thus making powerline communication significantly more difficult and even preventing it in the worst-case scenario.

Taking into account the above consideration, the most demanding framework conditions of a PV installation having a plurality of strings connected in parallel should be used as a basis for robustly operating powerline communication. In a corresponding PV installation, the DC circuit is formed by different branches of the PV generator, the direct current lines and the input stage of the inverter. In this case, the line lengths and the line routing, the impedances of the various strings which are dependent, inter alia, on the lighting situation and the number of PV modules connected in series and also, under certain circumstances, the input impedance of the inverter are decisive for the system impedance. In contrast to the AC low-voltage network of the domestic installation in which the system impedance is generally low and is also virtually constant, considerably higher and greatly varying impedances may occur in the DC circuit of the PV installation. These impedances vary not only from PV installation to PV installation but also inside a particular PV installation as a function of the time. The type of PV modules used, in particular whether they are modules based on polycrystalline or monocrystalline semiconductor material or so-called thin-film modules based on amorphous or microcrystalline semiconductor material, also has a great influence on the impedances and their variation.

In order to nevertheless achieve powerline communication with satisfactory reliability in PV installations, the highest possible signal strength has hitherto been coupled onto the direct current lines, on the one hand, and a received signal has been amplified in a complicated manner after being coupled out, on the other hand. However, an excessively high transmission level is no longer compatible with EMC (electromagnetic compatibility) guidelines under certain circumstances. Amplification carried out in each of the receivers is material-intensive and is therefore costly and, at high gain factors, is additionally also susceptible to interference from irradiated interference signals which are likewise amplified.

The document WO 2011/085952 A2 discloses an alternative method for transmitting data via lines for energy transmission, which method achieves transmission which is as unsusceptible to interference as possible. In this case, provision is made of an initialization phase in which a test signal is transmitted, which test signal is evaluated in the receiver with regard to its signal strength, in particular an amplitude. Depending on the evaluation result, a repetition rate is determined which indicates how often the data to be transmitted are repeated inside a data message. In the receiver, the repeatedly received signals are added in the correct phase in order to increase the signal-to-noise ratio, as a result of which it is possible to achieve the robust data transmission which is unsusceptible to interference. However, a complex receiver for adding the data received in succession in the correct phase is required.

SUMMARY

The present disclosure is directed to a system and a method for transmitting data via direct current lines for energy transmission, in which good signal transmission from a transmitting communication unit to a receiving communication unit is provided in a simple manner with the greatest possible independence from the arrangement of the communication units even inside a branched DC circuit as is present, for example, in the case of parallel strings in a PV generator.

A method according to the disclosure for transmitting data via direct current lines for energy transmission from a first communication unit to a second communication unit comprises the following steps: a high-frequency test signal having a predefined voltage amplitude is generated by the first or the second communication unit and is coupled onto the direct current lines. A level of a current caused by the high-frequency test signal on the direct current lines is then detected by the first communication unit. A voltage amplitude for a high-frequency signal is determined on the basis of the level of the current caused by the test signal, and such a high-frequency signal having the predetermined voltage amplitude is coupled onto the direct current lines by the first communication unit for the purpose of transmitting data to the second communication unit.

The test signal is therefore used, before the actual transmission of data, to determine transmission properties of the DC circuit comprising the direct current lines. The subsequent transmission of data from the first communication unit to the second communication unit can then be carried out with an accordingly adapted optimal signal amplitude for the high-frequency signal used to transmit the data. The data transmission method therefore has two stages, the test signal being used to measure the direct current lines, which are used to transmit the data, for the high-frequency signal used to transmit the data. The transmission property of the DC circuit comprising the direct current lines which is to be measured comprises the impedance of the DC circuit at or close to the frequencies relevant to the transmission of data. In this case, the test signal itself may be emitted either by the first communication unit or by the second communication unit, the test signal in one embodiment being emitted by the second communication unit, however, since it is ensured in this case that the determined transmission properties of the DC circuit actually reflect the conditions during a transmission process from the first communication unit to the second communication unit.

In one advantageous embodiment of the method, the test signal is repeatedly, in particular cyclically, coupled onto the direct current lines by the first or second communication unit. This ensures that data are transmitted at any time with an optimum signal amplitude even in the case of changing transmission properties of the DC circuit, for example as a result of changing impedances of the circuit.

In another advantageous embodiment of the method, the test signal is coupled in with a firmly predefined voltage amplitude. Alternatively, the voltage amplitude can be varied by the first or the second communication unit which emits the test signal. For example, the voltage amplitude can be increased starting from an initial value if the transmission properties of the DC circuit are such that the test signal otherwise cannot be received in a strength sufficient for evaluation, which can be determined by the transmitter of the test signal on the basis of absent feedback from the receiver of the test signal. Such feedback may be provided in response to a received test signal but also in response to data transmission.

In another advantageous embodiment of the method, the test signal is emitted with encoded information, the information comprising an identifier of the first or second communication unit which emits the test signal and/or an indication of the level of the voltage amplitude. Such a test signal with identifier transmission makes it possible, in a system having a plurality of communication units, to stipulate an optimal signal amplitude for data transmission individually for each communication unit receiving data. The level of the voltage amplitude of the test signal, as coded into the test signal, makes it possible to use voltage amplitudes which are not firmly predefined for the test signal.

In another advantageous embodiment of the method, in order to determine the voltage amplitude for the high-frequency signal for transmitting the data, an impedance of a transmission path for the high-frequency signal on the direct current lines is calculated from the current caused by the test signal and the voltage amplitude of the test signal. The transmission properties of the DC circuit comprising the direct current lines are substantially determined by the impedance of the DC circuit.

A system according to the disclosure of the type mentioned at the outset is distinguished by the fact that the first or the second communication unit comprises a test signal generator configured to generate a high-frequency test signal having a predefined voltage amplitude, and the first communication unit comprises current measuring circuitry configured to determine a level of a current caused by the test signal on the direct current lines. The first communication unit also comprises a signal generator configured to generate a high-frequency signal having a variable voltage amplitude that transmits data to the second communication unit, as well as a control device configured to set the voltage amplitude of the high-frequency signal on the basis of the level of the current caused by the test signal. A system having communication units designed in this manner is suitable for carrying out the method described above. The advantages described in connection with the method result.

In one advantageous embodiment of the system, the coupling-in circuitry and/or the coupling-out circuitry of the communication units comprise galvanically isolating transformers with at least two windings, one of which is looped into the direct current lines. Both the test signal and the signal that transmits data can be directly coupled in and/or out using the transformers arranged in the DC circuit in this manner. Alternatively, capacitively operating coupling-in and/or coupling-out circuitry may also be used.

In another advantageous embodiment of the system, the system is arranged in a PV installation. The PV installation comprises a PV generator comprising at least one string which is connected to an inverter via direct current lines. The first communication unit is assigned to the inverter and at least one second communication unit is assigned to the at least one string. In one embodiment the PV installation comprises at least two strings connected in parallel, a second communication unit being assigned to each of the strings.

In a further embodiment, the disclosure accordingly relates to a PV installation having a PV generator comprising at least one string which is connected to an inverter via direct current lines, wherein the PV installation comprises such a system for transmitting data via the direct current lines.

In PV installations in which the impedance varies in terms of time overall and inside individual strings connected in parallel, the method according to the disclosure and the system in PV installations can be used in a particularly advantageous manner to securely transmit data between communication units which are arranged close to the inverter or inside the individual strings.

BRIEF DESCRIPTION OF THE DRAWINGS

The disclosure is explained in more detail below using example embodiments with the aid of figures, in which.

DETAILED DESCRIPTION

The disclosure relates to a system for transmitting data via direct current lines for energy transmission, comprising at least one first and one second communication unit, each of which has a coupling means for coupling high-frequency signals onto the direct current lines and/or a coupling-out means for coupling HF signals from the direct current lines. The disclosure also relates to a method for transmitting data via direct current lines for energy transmission and to a photovoltaic installation having such a system.

Figure 1:
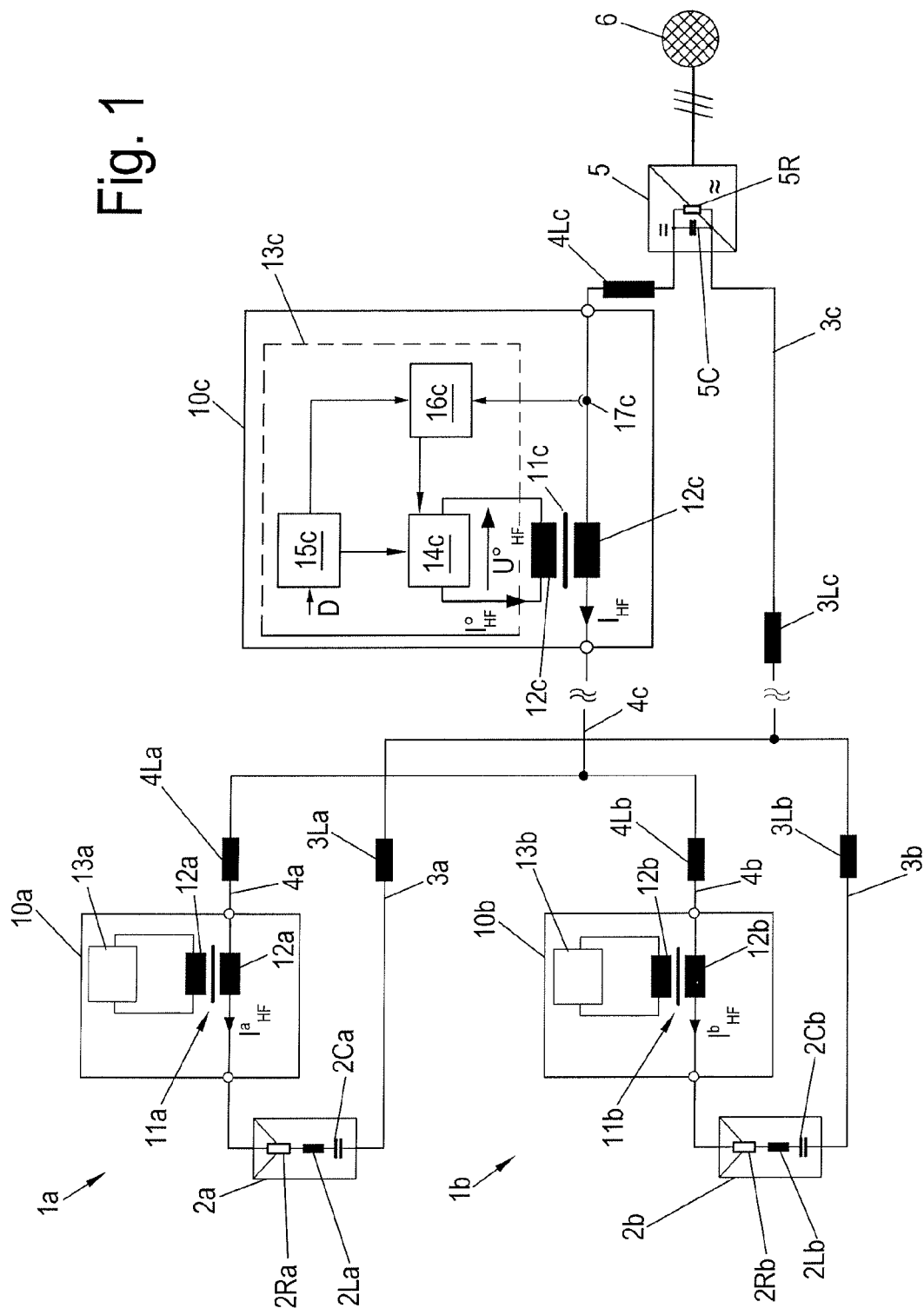
FIG. 1 shows a block diagram of a PV installation.

FIG. 1 shows a schematic block diagram of a PV installation in a first example embodiment. The PV installation comprises, as the PV generator, two strings 1a and 1b which are connected in parallel. For the purpose of distinction, components which are assigned to the individual strings 1a and 1b are likewise identified by an added "a" or "b" in their reference symbol below. If a reference symbol is used without such an addition, either all components are addressed with this reference symbol irrespective of their addition or one of these components (not specified any further) is addressed with this reference symbol. Depending on the context, a reference to "string 1" therefore relates either generally to the strings 1a and 1b or to one of the strings 1a or 1b.

Each of the strings 1 has at least one PV module 2 which is symbolized in the present case by means of the circuit symbol for an individual PV cell. It goes without saying that a plurality of PV modules 2 connected in series may be provided inside each string 1. A series connection of a series resistor 2R, an inductance 2L and a capacitor 2C is depicted in the circuit symbol for the PV module 2. The series connection of these three elements symbolizes the equivalent circuit diagram of the PV module 2.

The two strings 1a, 1b illustrated by way of example in FIG. 1 are connected in parallel with one another via direct current lines 3a and 4a or 3b and 4b. The parallel circuit of the strings 1a and 1b is then connected to a DC input of an inverter 5 via common direct current lines 3c, 4c. An input resistor 5R, which the inverter 5 has between its DC inputs, and an input capacitance 5C are symbolically depicted in the inverter 5 as the equivalent circuit diagram of the DC side of the inverter 5. The inverter 5 also has an AC output via which it is coupled to an energy supply network 6.

By way of example, the AC output and the energy supply network 6 have three phases. However, within the scope of the application, both the inverter 5 and the energy supply network 6 may have a different number of phases, for example one phase. It is noted that FIG. 1 shows only elements of the PV installation which are essential within the scope of the application. Switching elements (for example disconnecting elements, contactors), filters (for example a sinusoidal filter), network monitoring devices and/or transformers, which are not illustrated, may therefore be provided on the DC side and/or AC side of the inverter 5, for example.

Inductances 3La, 4La, 3Lb, 4Lb and 3Lc, 4Lc which symbolize the line inductances of the direct current lines 3, 4 are depicted in the direct current lines 3, 4. Depending on the properties of the direct current lines 3, 4, for example their length, cable routing etc., and the considered frequencies of transmitted HF signals, non-reactive resistors and capacitances may also be relevant for signal transmission in addition to the inductances. In this sense, the inductances are representative of the line impedances.

A communication unit 10 is arranged in each of the strings 1. Although the disclosure is not restricted to bidirectional communication, but rather can also be used for the case of unidirectional communication, for example starting from the communication units 10a, 10b inside the strings 1a, 1b in the direction of the communication unit 10c close to the inverter, the further details are explained with the example use of bidirectional communication units 10. On account of this, the communication units 10 are also referred to as transceivers 10 below. In addition to the transceivers 10a and 10b arranged in the strings 1a and 1b, a further transceiver is arranged in the region of the inverter 5. This is referred to as transceiver 10c below. In this case, the transceiver 10c may be accommodated either inside a housing of the inverter 5 or else in a separate housing in the vicinity of the inverter 5.

The transceivers 10 are used to interchange high-frequency (HF) signals for transmitting data via the direct current lines 3, 4. In this case, the data may be modulated onto the high-frequency signal in a manner known per se, for example in an amplitude, frequency or phase modulation method. Each of the transceivers 10 comprises, as coupling-in and/or coupling-out circuitry, a transformer 11 having two magnetically coupled windings 12, one of which is respectively looped into one of the direct current lines 3, 4. In FIG. 1, by way of example, the transformers are each looped into the direct current lines 4, specifically the transformer 11c of the transceiver 10c is looped into the common direct current line 4 in the vicinity of the inverter 5, the transformer 11a of the transceiver 10a is looped into the direct current line 4a inside the string 1a and the transformer 11b of the transceiver 10b is looped into the direct current line 4b inside the string 1b.

The winding 12 of one of the transformers 11 which is not respectively looped into the direct current line 3, 4 is connected to a control and evaluation circuit 13. The control and evaluation circuit 13 is illustrated in more detail by way of example in FIG. 1 for the transceiver 10c which is close to the inverter. The control and evaluation circuit 13 comprises a signal generator 14 which is controlled by a data interface unit 15. The data interface unit 15 converts (binary) data D, which are supplied to it and are to be transmitted, into corresponding control signals for the signal generator 14 depending on the selected modulation method. A control device 16 is also provided, which control device is connected to a current measuring circuit 17 which is likewise looped into the direct current line 4. The control device 16 acts on the signal generator 14 and may influence, in particular, a voltage amplitude $U_{HF}^0$ of an HF signal emitted by the signal generator 14 or a current amplitude $I_{HF}^0$. This signal results in an HF signal with a voltage amplitude $U_{HF}$ and a current amplitude $I_{HF}$ on the direct current lines 3, 4.

In alternative refinements of the transceiver 10, capacitive coupling-in of the HF signal can also be employed instead of the inductive coupling-in (shown here) via the transformer 11.

The components of the control and evaluation circuit 13c which are illustrated in the transceiver 10c relate to coupling of the HF signal onto the direct current lines 4, that is to say a transmitting process. The transceivers 10 are usually set up both to transmit and to receive data. Therefore, an evaluation unit (not illustrated here) is provided in parallel with the signal generator 14, which evaluation unit possibly amplifies and/or filters HF signals applied to the direct current lines 3, 4 by other transceivers after coupling-out by the transformer 11 and transmits them to the data interface unit 15.

In the PV installation illustrated in FIG. 1, both the transceiver 10c close to the inverter and the transceivers 10a, 10b close to the generator are designed for transmitting and receiving operation. Therefore, such an arrangement enables bidirectional communication both from the transceivers 10a, 10b close to the generator in the direction of the transceiver 10c close to the inverter and vice versa. As already described above, however, the method is not restricted to bidirectional communication. Within the scope of the disclosure, the method can therefore also be applied to unidirectional communication, for example from a transmitting unit (transceiver 10c) close to the inverter in the direction of receiving units (transceivers 10a, 10b) close to the generator. In this case too, the transceivers 10a, 10b provided for receiving the signals are also able, in addition to coupling out and evaluating the HF signals transmitted to them, to transmit a high-frequency test signal with a predefined voltage amplitude $U_{TXa}$ in the direction of the transmitting unit, however. However, in one embodiment the transmitting operation is then restricted only to the transmission of the HF test signal with a predefined voltage amplitude. In particular, in addition to possible coding—for example from which string or from which receiving unit the test signal has been transmitted and/or an identification of the signal as HF test signal—the HF test signal otherwise does not contain any further data information. In the case of unidirectional communication, the receiving units can therefore be more cost-effective on account of lower requirements on their functionality relative to the transceivers for bidirectional communication.

Figure 2:
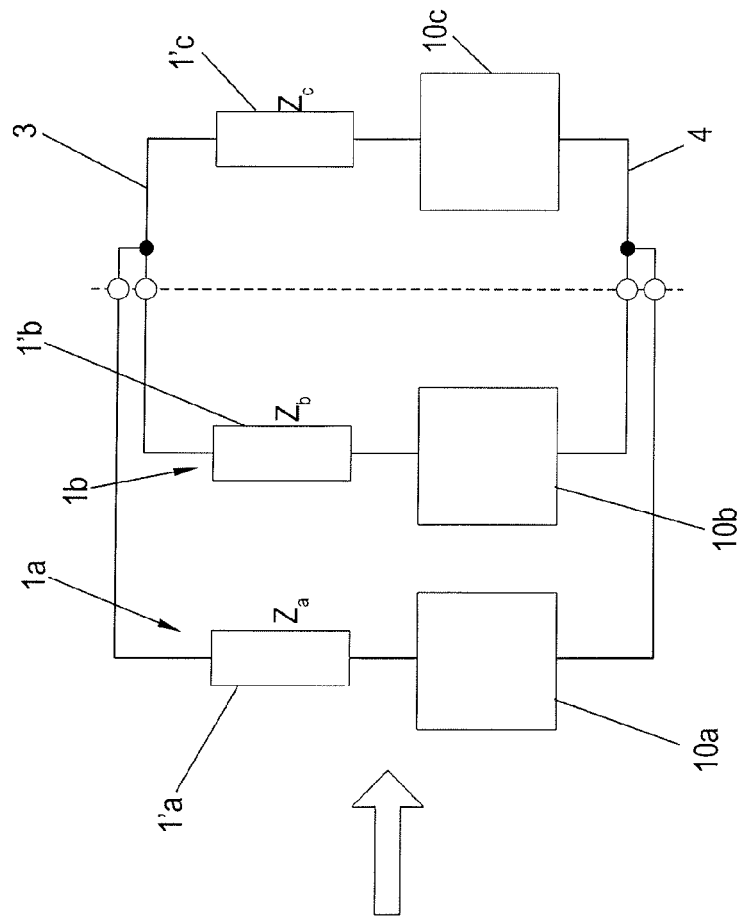
FIG. 2 shows a block diagram of a DC side of a PV installation and its abstractions in the equivalent circuit diagram.
Figure 2:
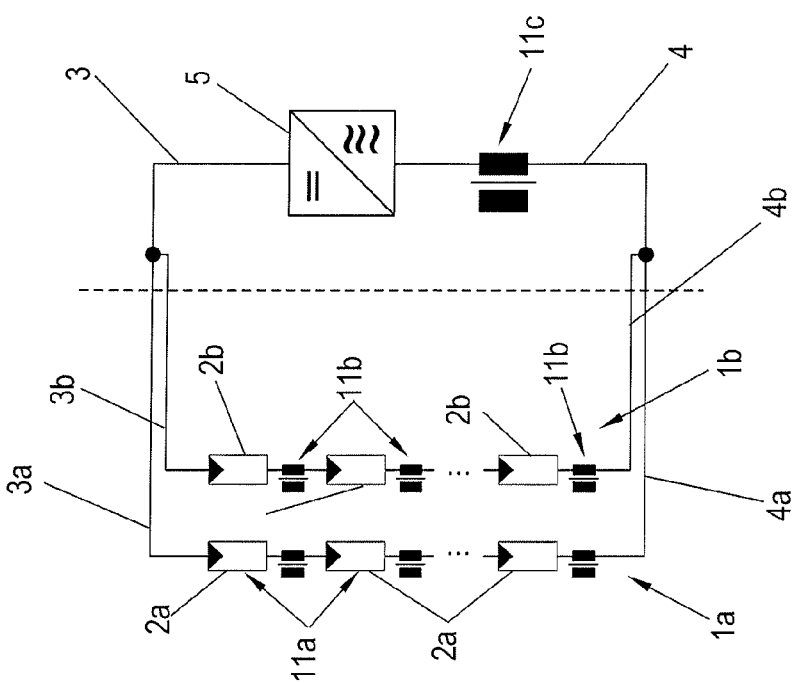

For the detailed description of the method according to the disclosure for transmitting data via direct current lines for energy transmission, an abstracted equivalent circuit diagram of a PV installation, for example the PV installation in FIG. 1, is used as a basis below. The abstraction carried out is explained using FIG. 2. The left-hand part of FIG. 2 illustrates a block diagram of a PV installation having two strings 1a, 1b and an inverter 5. In contrast to the example embodiment in FIG. 1, a plurality of photovoltaic modules 2a and 2b which are connected in series are illustrated in each string in the present case. A transceiver 10a, 10b, which is represented here by a transformer 11a and 11b in the left-hand part of FIG. 2, is assigned to each of the photovoltaic modules 2a and 2b. A transceiver 10c, which is close to the inverter and is represented by its transformer 11c, is arranged in a manner connected in series with the inverter 5.

In a further abstraction which is represented on the right-hand side of FIG. 2, only one transceiver 10a, 10b is respectively represented in each of the strings 1a, 1b. All of the other components are combined in the form of an equivalent impedance 1'a and 1'b. The value of this equivalent impedance 1'a and 1'b is $Z_a$ and $Z_b$. In a similar manner, the impedance which is present in this section of the DC circuit beside the transceiver 10c and is substantially given by the inverter 5 and the inductance of the commonly used direct current lines 3, 4 is combined as an equivalent impedance 1'c with the impedance value $Z_c$ on the side remote from the generator.

The method according to the disclosure for transmitting data via the direct current lines 3, 4 relates to transmission from one of the transceivers 10a or 10b to the transceiver 10c as the receiver and to transmission from the transceiver 10c as the transmitter to one of the transceivers 10a, 10b as the receiver inside one of the strings 1a, 1b. These two situations are respectively illustrated again in FIGS. 3 and 4. As already mentioned, unidirectional or bidirectional data transmission may be provided here.

Figure 3:
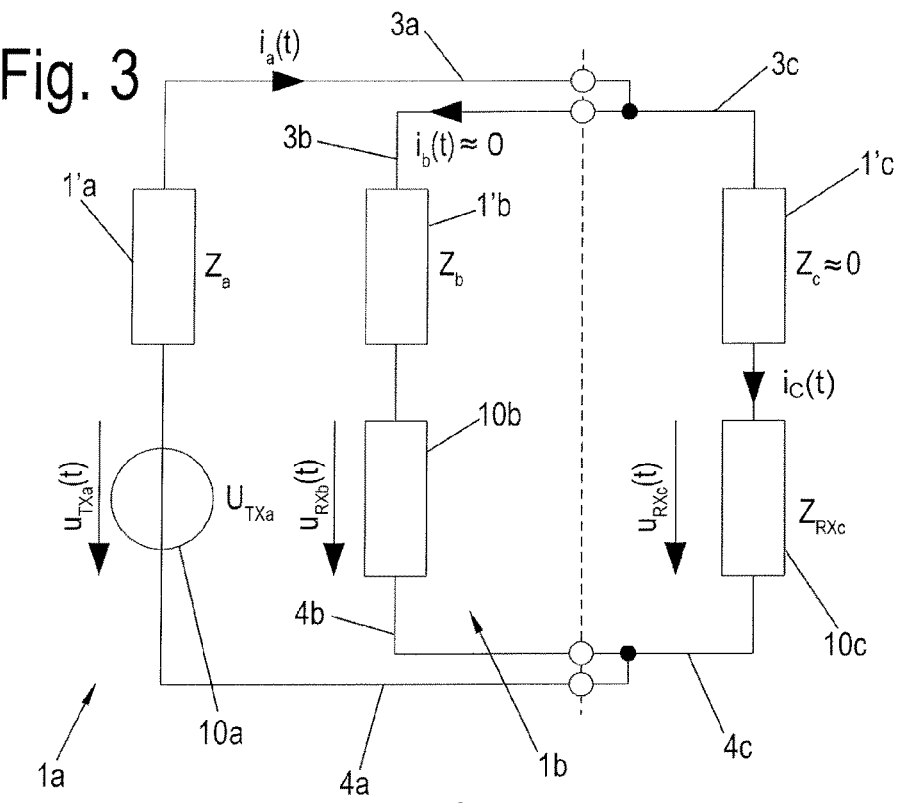
FIGS. 3 and 4 show the equivalent circuit diagram of the PV installation according to FIG. 2 for different transmitting and receiving constellations.

FIG. 3 shows transmission of signals from the transceiver 10a, that is to say from one of the transceivers inside the string 1a, to the transceiver 10c close to the inverter. Therefore, in FIG. 3, the transceiver 10a is represented by the symbol for an AC voltage source which provides an AC voltage $u_{TXa}(t)$ of the amplitude $U_{TXa}$ at its output. This AC voltage amplitude coupled in by the transceiver 10a results in an alternating current $i_a(t)$ of the current amplitude $I_a$ which is likewise time-dependent, the level of said current amplitude depending on the voltage amplitude $U_{TXa}$ and the sum of the impedances of the transceiver 10a and the remaining string impedance $Z_a$. The level of the current amplitude $I_a$ likewise also depends on the total impedance inside the string 1b—represented by the equivalent impedance $Z_b$ and the impedance of the transceivers $Z_{RXb}$—and on the impedances $Z_c$ and $Z_{RXc}$ in the branch of the inverter 5.

Figure 4:
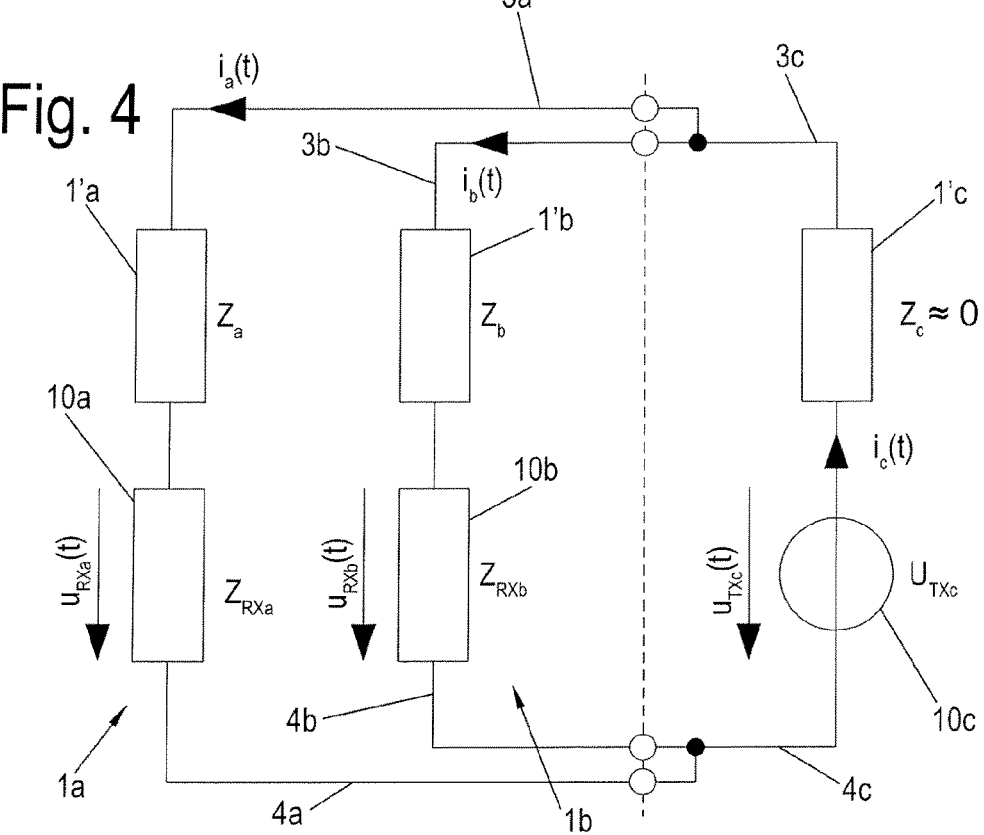

The dashed line in FIG. 3 and FIG. 4 indicates the boundary of the inverter housing in the corresponding example embodiments and thus illustrates the connection of the individual strings 1a, 1b to the inverter 5. By way of example, all components to the right of the dashed line are accommodated in the inverter housing here, while all components to the left of the dashed line are situated outside the inverter housing. The individual strings 1a, 1b are actually connected in parallel here inside the inverter housing. However, this is only one possible alternative of the parallel connection of both strings 1a, 1b. Alternatively, it is possible for the two strings 1a, 1b to be connected in parallel outside the inverter housing, for example close to the generator. At the connecting point between the direct current lines 3a, 3b or 4a or 4b and the direct current lines 3c and 4c, the HF alternating current generated in the string 1a in this manner is divided into partial currents in the string 1b and in the inverter branch according to Kirchhoff's law. Under the realistic assumption that the impedance $Z_c$ of the inverter is very much smaller than the impedance $Z_b$ in the string 1b, the current $i_b(t)$ through the string 1b is negligibly small in comparison with the current $i_c(t)$ through the inverter branch. $i_c(t) \approx i_a(t)$ therefore applies to this current.

In a method according to the disclosure for transmitting data via the direct current lines 3, 4, provision is made for a test signal with a known voltage amplitude $U_{TXa}$ to be emitted by one of the transceivers, here the transceiver 10a. Depending on the instantaneous impedances inside the DC branches, current signals $i_a(t)$, $i_b(t)$, $i_c(t)$ are therefore established in the individual DC branches. In the inverter branch, the current signal $i_c(t)$ is received by the transceiver 10c and, taking into account the impedance $Z_{RXc}$ of the transceiver 10c, results there in a voltage drop $u_{HXc}(t)=i_c(t)*Z_{HXc}$, the amplitude $U_{HXc}$ of which is measured. Under the assumption just reasoned that $i_c(t) \approx i_a(t)$ and assuming that the impedances of the transceivers 10a, 10b and 10c are the same in the transmitting case as in the receiving case but are at least known, the impedance $Z_a$ can now be determined by the transceiver 10c from the known transmission amplitude $U_{TXa}$ and the measured reception amplitude $U_{RXC}$.

If, in a next step, the transceiver 10c acts as a transmitter and transmits a signal to the transceiver 10a in the string 1a, the information relating to the string impedance Za, which is obtained from the test signal from the transceiver 10a, can be used by the transceiver 10c as the transmitter to set a predefined desired signal strength at the transceiver 10a. The situation in which the transceiver 10c acts as a transmitter is illustrated in FIG. 4. It is again assumed that the impedance $Z_c$ of the inverter 5 is negligibly small. In order to generate a desired current of the amplitude $I_a$ in the string 1a, the transceiver 10c must set an amplitude $U_{TXc}=I_a*(Z_{RXa}+Z_a)$. On account of the impedance $Z_c$ which is assumed to be negligible, this voltage is likewise applied to the connecting point between the direct current lines 3a, 3b or 4a or 4b and the direct current lines 3c and 4c. In the case of a test signal emitted by the string 1b, the string impedance $Z_b$ can accordingly be determined by the transceiver 10c in a similar manner to FIG. 3. If a signal is intended to be transmitted from the transceiver 10c as the transmitter to the transceiver 10b in the string 1b, a voltage required for this purpose can be accordingly set by the transceiver 10c.

Figure 5:
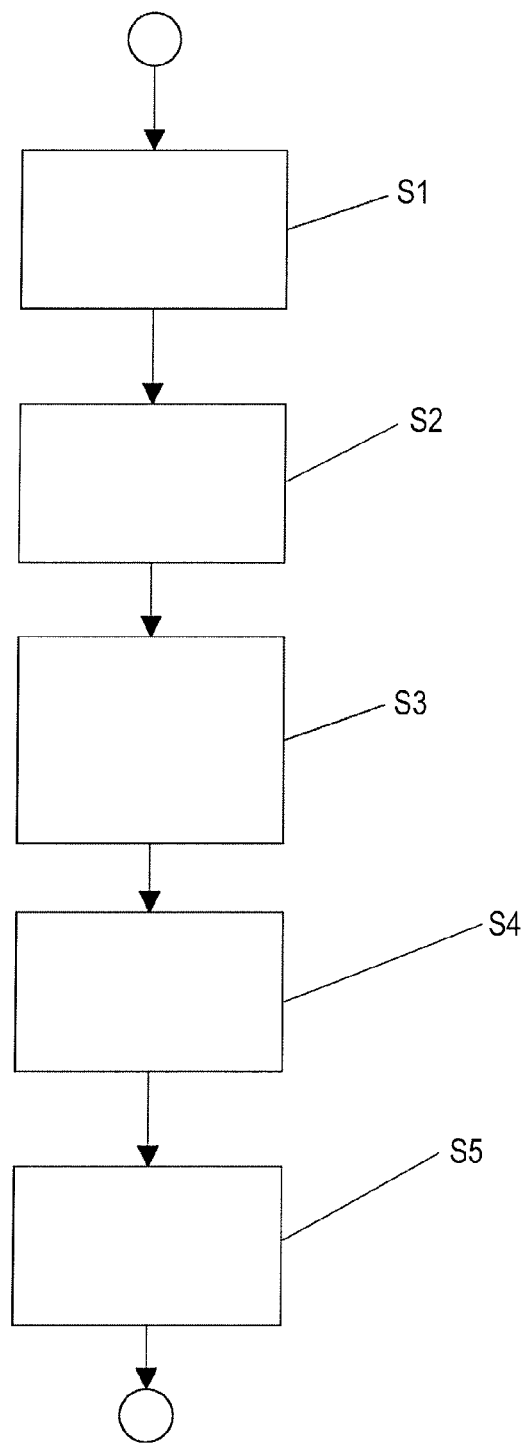
FIG. 5 shows a flowchart of a method for transmitting data via direct current lines, and FIGS. 6 and 7 each show an equivalent circuit diagram of a DC side of a PV installation in a further example embodiment.

FIG. 5 represents an example embodiment of a method according to the disclosure for transmitting data via direct current lines, again in the form of a flowchart. The method can be carried out, for example, by a PV installation as illustrated in FIG. 1 or FIG. 2. Reference symbols used therefore relate, by way of example, to an example embodiment according to FIG. 1 or FIG. 2.

In a first act S1, one of the transceivers 10a from one of the strings, here from the string 1a by way of example, transmits a high-frequency test signal with a defined amplitude $U_{TXa}$. This test signal can be emitted repeatedly, for example regularly. The test signal can be emitted in the form of a data signal, an identifier of the emitting transceiver 10a being included in these data in coded form. The information can be encoded using known methods by means of amplitude, phase and/or frequency modulation. In addition to the identifier of the transceiver 10a, the fact that the emitted signal is a test signal may be included in coded form. In this case, the signal amplitude $U_{TXa}$ may be firmly predefined and may be known to the receivers in the system. It is also possible for the magnitude of the signal amplitude $U_{TXa}$ to be concomitantly transmitted in the test signal itself in coded form. In such a case, the signal amplitude $U_{TXa}$ may also be varied, for example may increase during each repetition of the emission if there is no feedback from another of the transceivers (for example the transceiver 10c in the subsequent act S4) to the transceiver 10a.

In a next act S2, the transceiver 10c close to the inverter receives a high-frequency current amplitude $I_c$ associated with the test signal.

In a third act S3, the transceiver 10c or a control unit connected to the latter calculates a required transmission amplitude $U_{TXc}$ from the known transmission amplitude of the test signal $U_{TXa}$ and the received current amplitude $I_c$ in order to in turn transmit data to the transceiver 10a in the string 1a. In order to calculate this individual transmission amplitude $U_{TXc}$, it is assumed that the current $i_c(t)$ received by the transceiver 10c corresponds, in terms of its amplitude, to the transmission current $i_a(t)$ of the test signal in the string 1a. With a known impedance of the transceivers 10a and 10c and assuming that the inverter 5 has a negligibly small impedance $Z_c$, the impedance $Z_a$ in the string 1a can be determined from the received current amplitude $I_c$ and the known transmission amplitude of the test signal $U_{TXa}$, which impedance can in turn be used to determine the individual transmission amplitude $U_{TXc}$.

In act S4, the transceiver 10c close to the inverter transmits data to the transceiver 10a with the calculated transmission amplitude $U_{TXc}$.

These data transmitted in act S4 are received by the transceiver 10a in the string 1a with the defined desired current amplitude $I_a$ in act S5.

The described method is repeated for data transmissions from the transceiver 10c to the further string 1b or to other further strings of the PV installation with individual transmission amplitudes $U_{TXc}$, which are accordingly likewise determined using test signals, for the transceiver 10b or further transceivers.

In an alternative embodiment of the method, provision is made for a test signal emitted by the transceiver 10a or 10b inside the strings 1a, 1b to result in a current amplitude $I_a$ or $I_b$ inside the string 1a, 1b, the current amplitude $I_a$ or $I_b$ being measured by the transceiver 10a, 10b itself which emits the test signal. Assuming that the impedance $Z_c$, which is composed of the impedance of the inverter 5 and the impedance of the commonly used direct current lines 3, 4 close to the inverter, is negligibly small, the impedance $Z_a$ and $Z_b$ of the respective string 1a, 1b can be determined by the transceiver 10a, 10b.

During a subsequent process of transmitting data from the transceiver 10a, 10b to the transceiver 10c close to the inverter, a transmission amplitude $U_{TXa}$ or $U_{TXb}$ can accordingly be calculated, with knowledge of the impedance $Z_a$ or $Z_b$, in such a manner that a desired current amplitude $I_c$ results in the inverter branch and a desired reception amplitude $U_{RXc} = I_c * Z_{RXc}$ is therefore detected at the transceiver 10c.

Figure 6:
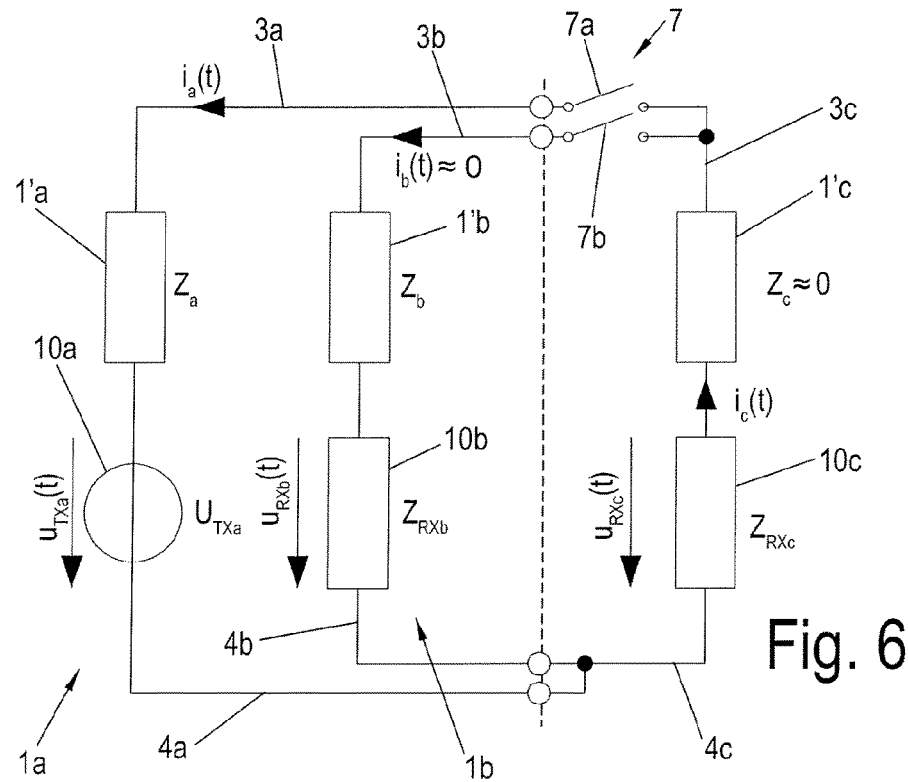

FIG. 6 shows another example embodiment of a method according to the disclosure and an apparatus according to the disclosure for transmitting data via direct current lines. A switching element 7 is provided in this example embodiment, which switching element makes it possible to disconnect or connect the individual strings 1a, 1b in a controlled manner. For this purpose, switches 7a and 7b which can be controlled separately are arranged in the direct current lines 3a, 3b. If all of the strings 1a, 1b, apart from one string, are respectively disconnected, the transceiver 10c can in turn emit a test signal of a known amplitude and can determine the amplitude of a current $i_c$ caused thereby. As an alternative to acts S1 and S2, a pair of values of voltage and current amplitude can thus be determined and can be used to determine the respective impedance $Z_a$ or $Z_b$. For a subsequent process of transmitting data from the transceiver 10c close to the inverter to the transceiver 10a or 10b, a transmission amplitude $U_{TXc}$ can accordingly be individually determined and set again.

Figure 7:
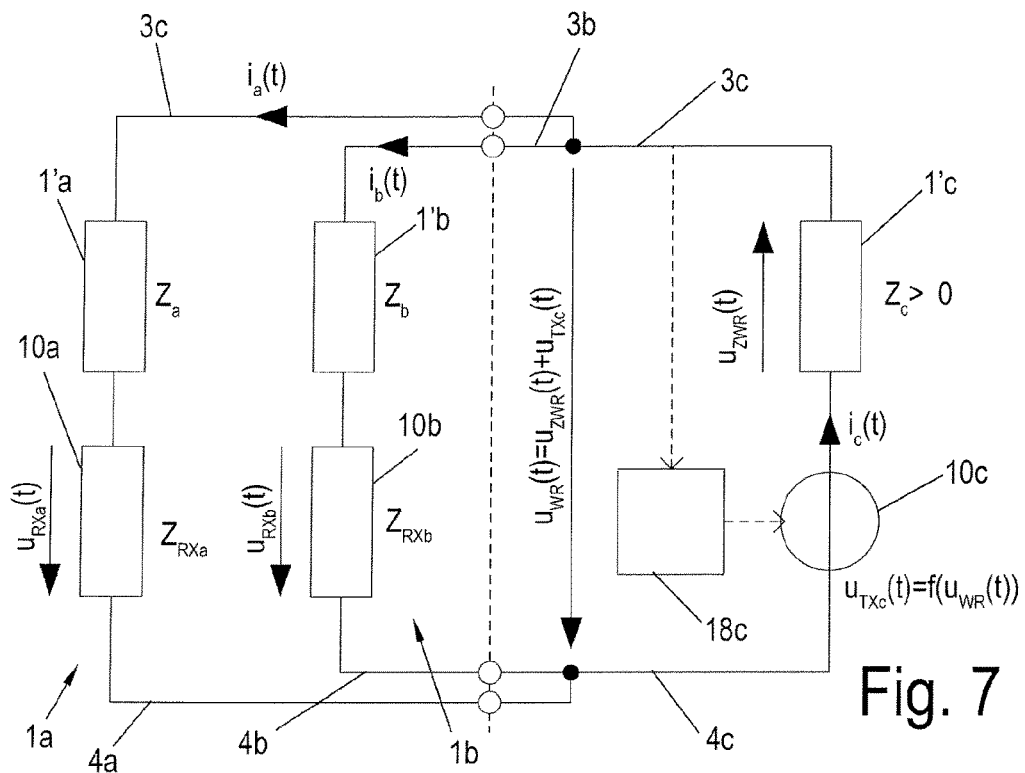

FIG. 7 shows another example embodiment of a method according to the disclosure and an apparatus according to the disclosure for transmitting data via direct current lines. In a comparable manner to FIG. 4, FIG. 7 illustrates a transmitting process of a transceiver 10c close to the inverter. In the example embodiment in FIG. 7, it is assumed that the impedance $Z_c$, which is composed of the impedance of the inverter 5 and the impedance of the commonly used direct current lines 3, 4, is not negligibly small. In order to nevertheless cause a defined current in one of the strings 1a or 1b during the transmitting process even if an unknown voltage of the amplitude $U_c$ is dropped across the inverter 5 and the commonly used direct current lines 3, 4, that is to say the impedance Zc, the desired transmission amplitude $U_{TXc}$ is not set at the transformer 11c during the transmitting process, but rather at the series connection of the transformer 11c and the equivalent impedance $Z_c$ assigned to the inverter branch. This ensures that the desired voltage $U_{TXc}$ is present at the branch point from the inverter branch to the individual strings 1a, 1b.

In FIG. 7 too, the dashed line marks the boundary of the inverter housing and illustrates the connection of the individual strings to the inverter. All components to the right of the dashed line are located in the inverter housing, while all components to the left of the dashed line are situated outside the inverter housing. In order to ensure that the desired voltage $u_{TXc}$ is applied to the branch point from the commonly used direct current lines 3, 4 to the individual strings 1a, 1b, provision may be made for the high-frequency voltage present at the series circuit of the transformer 11c and the equivalent impedance $Z_c$ assigned to the inverter branch to be measured and for the voltage coupled in at the transformer 11c to be selected in such a manner that the measured voltage corresponds to the desired transmission voltage $u_{TXc}$. For this purpose, the control loop 18c is provided on the inverter side as part of the transceiver 10c.

The invention claimed is:

1. A method for transmitting data via direct current lines for energy transmission from a first communication unit to a second communication unit, comprising:
   generating a high-frequency test signal having a predefined voltage amplitude by the second communication unit and coupling the generated high-frequency test signal onto the direct current lines using the second communication unit;
   determining a level of a current caused by the high-frequency test signal on the direct current lines by the first communication unit;
   determining a voltage amplitude for a high-frequency data signal based on the determined current level caused by the high-frequency test signal using the first communication unit; and
   coupling a high-frequency data signal having the determined voltage amplitude onto the direct current lines by the first communication unit for the purpose of transmitting data to the second communication unit.

2. The method as claimed in claim 1, wherein the high-frequency test signal is repeatedly coupled onto the direct current lines by the second communication unit.

3. The method as claimed in claim 2, wherein the high-frequency test signal is coupled onto the direct current lines in a cyclically repeated manner.

4. The method as claimed in claim 1, wherein the high-frequency test signal is coupled onto the direct current lines with a firmly predefined voltage amplitude.

5. The method as claimed in claim 2, wherein the predefined voltage amplitude is varied by the second communication unit which emits the high-frequency test signal.

6. The method as claimed in claim 1, wherein the high-frequency test signal is emitted with encoded information, the encoded information comprising an identifier of the second communication unit which emits the high-frequency test signal and/or an indication of the voltage amplitude level of the high-frequency test signal.

7. The method as claimed in claim 1, wherein, determining the voltage amplitude for the high-frequency data signal for transmitting the data comprises calculating an impedance of a transmission path for the high-frequency signal on the direct current lines from the determined current caused by the test signal and the voltage amplitude of the test signal.

8. The method of claim 1, wherein the first communication unit is assigned to and is local to a string of photovoltaic modules, and wherein the second communication unit is assigned to and is local to an inverter.

9. The method of claim 1, wherein the first communication unit is assigned to and is local to an inverter, and wherein the second communication unit is assigned to and is local to a string of photovoltaic modules.

10. A system for transmitting data via direct current lines for energy transmission, comprising at least one first communication unit and one second communication unit, each of which comprising:
   a coupling-in circuitry configured to couple high-frequency signals onto the direct current lines; and/or
   a coupling-out circuitry configured to couple high-frequency signals from the direct current lines,
   wherein the first communication unit or the second communication unit comprises a test signal generator configured to generate a high-frequency test signal having a predefined voltage amplitude, the first communication unit comprises current measuring circuitry configured to determine a current level caused by the high-frequency test signal on the direct current lines, and the first communication unit comprises a signal generator configured to generate a high-frequency data signal having a variable voltage amplitude for transmitting data to the second communication unit, and a control device configured to set the voltage amplitude of the high-frequency data signal based on the current level caused by the high-frequency test signal.

11. The system as claimed in claim 10, wherein the coupling-in circuitry and/or the coupling-out circuitry of the first communication unit and the second communication unit comprise galvanically isolating transformers with at least two windings, wherein one of the at least two windings is respectively looped into one of the direct current lines.

12. The system as claimed in claim 10, arranged in a photovoltaic installation having a PV generator comprising at least one string which is connected to an inverter via direct current lines, and at least one of the first communication unit or the second communication unit respectively being assigned to the inverter and the at least one string.

13. The system as claimed in claim 12, wherein the photovoltaic installation comprises at least two strings connected in parallel, and wherein a first communication unit or second communication unit being assigned to each of the strings.

14. A method for transmitting data via direct current lines for energy transmission from a first communication unit to a second communication unit, comprising:

generating a high-frequency test signal having a predefined voltage amplitude by the first communication unit and coupling the generated high-frequency test signal onto the direct current lines;

determining a level of a current caused by the high-frequency test signal on the direct current lines by the first communication unit;

determining a voltage amplitude for a high-frequency data signal based on the determined current level caused by the high-frequency test signal by the first communication unit; and coupling a high-frequency data signal having the determined voltage amplitude onto the direct current lines by the first communication unit for the purpose of transmitting data to the second communication unit.

15. The method of claim 14, wherein the first communication unit is assigned to and is local to a string of photovoltaic modules, and wherein the second communication unit is assigned to and is local to an inverter.

16. The method of claim 14, wherein the first communication unit is assigned to and is local to an inverter, and wherein the second communication unit is assigned to and is local to a string of photovoltaic modules.

17. The method of claim 14, wherein the high-frequency test signal is repeatedly coupled onto the direct current lines by the first communication unit.

18. The method of claim 14, wherein the high-frequency test signal is coupled onto the direct current lines with a firmly predefined voltage amplitude.

19. The method of claim 14, wherein the predefined voltage amplitude is varied by the first communication unit which emits the high-frequency test signal.

* * * * *

Adverse Decisions in Interference

In the designated interferences involving the following patents, final decisions have been rendered that the respective patentee are not entitled to the patent containing the claims listed.

Patent No. 9,831,916, Behrends Holger, METHOD AND SYSTEM FOR TRANSMITTING DATA VIA DIRECT CURRENT LINES, Interference 106,144, final judgment adverse to the patentee rendered 10/01/2024, as to claims 1-19.